United States Patent
Malifaud

[11] B 3,995,153
[45] Nov. 30, 1976

[54] OPTICAL PROJECTORS
[75] Inventor: Pierre Malifaud, Paris, France
[73] Assignee: Ste de Recherche et de Promotion d'Activities Nouvelles ACNO, Paris, France
[22] Filed: Mar. 25, 1974
[21] Appl. No.: 454,283
[44] Published under the second Trial Voluntary Protest Program on February 3, 1976 as document No. B 454,283.

[30] Foreign Application Priority Data
Mar. 4, 1973 France .......................... 73.11871
Mar. 4, 1973 France .......................... 73.11872

[52] U.S. Cl. ..................... 240/41.35 R; 352/198
[51] Int. Cl.² ............................................. F21V 7/00
[58] Field of Search .............. 240/41.37, 41.35 C, 240/41.35 E, 41.35 R; 352/198

[56] References Cited
UNITED STATES PATENTS
3,318,184  5/1967  Jackson .................. 352/198 X
3,676,667  7/1972  Malifaud ............... 240/41.35 R
3,711,701  1/1973  Squyres .................. 240/41.35 R

*Primary Examiner*—Richard M. Sheer
*Attorney, Agent, or Firm*—Stevens, Davis, Miller & Mosher

[57] ABSTRACT

Optical projectors of the kind which supply a beam of radiation whose total angular field $2p'$ is determined in at least one reference plane, the angular field containing all the radiant flux, the projector also incorporating a source of radiation associated with a reflecting optical collector system, a conoid or pyramidoid mirror which has at least the reference plane as a plane of symmetry and the minor base of which in conjunction with the reflecting optical collector system, entirely contains optically the source of radiation. The mirror is made to conform to the following dimensional relationships which apply to each cross-section of the mirror through a plane of symmetry:

$$\frac{D}{d} \cong \frac{\sin(\theta - \gamma)}{\sin(\theta' - \gamma)},$$

where D and d are respectively the cross-sectional lengths of the major and minor bases of the mirror in the cross-sectional plane in question, $\gamma$ is half the mean apex angle of the mirror in the cross-sectional plane in question, and $\theta$ is half the maximum predetermined angle of the angular extension of the radiant beams received at the minor base of the mirror.

7 Claims, 3 Drawing Figures

OPTICAL PROJECTORS

BACKGROUND OF THE INVENTION

The present invention relates to optical projectors of the kind which supply a beam of radiation, the total angular field of which is pre-determined in at least one reference plane, said angular field containing all the radiant flux and incorporating a source of radiation associated with a reflecting optical collector system, a conoid or pyramidoid mirror which has at least the said reference plane as a plane of symmetry and the minor base of which, in conjunction with said reflecting optical collector system, entirely contains optically said source of radiation. Throughout the present specification the expression "conoid or pyramidoid mirror" is intended to mean a mirror the shape of which is that of the lateral surface of a geometric solid which terminates in two mutually parallel end-surfaces of different area, which are permeable to radiation, the cross-sectional area of the solid increasing progressively from its minor base to its major base, the two bases being connected together by reflective lateral faces and the geometric solid in question having at least two planes of symmetry perpendicular to the bases. The intersection between these two planes of symmetry forms the central optical axis of such conoid or pyramidoid mirror. Furthermore, the word "pyramidoid" means more particularly a mirror of this type in which the bases are substantially polygonal and the adjoining reflective lateral faces are plane or substantially plane (that is to say slightly curved or cambered).

It is already known to fix the dimensions of a conoid or pyramidoid mirror in such a way that all the flux received at the minor base (less reflection losses) is projected from the major base. The dimensional ratio proposed for use may be written as $$\frac{D}{d} \simeq \frac{\cos \gamma}{\sin (\theta' - \gamma)}$$

where $D$ and $d$ are the cross-sectional lengths of the major and minor bases of the mirror respectively when the cross-section is taken centrally, $\gamma$ is half the mean apex angle in this cross-sectional plane of the conoid or pyramidoid mirror, and $\theta'$ is half the total angular field of the projected flux, which is predetermined, the field in question containing the whole of the projected flux.

The dimensional relationships here proposed do not take into account the aperture angle of the radiant beam received at the minor base of the mirror, with the result that, when this angle is greater than 180°, the proposed relationships do not allow the best optimization to be achieved, that is to say the least ratio $D/d$ and the minimum length of the conoid or pyramidoid mirror, which would result in smaller overall size and which would reduce the number of reflections in the mirror.

It is an object of the invention to remove or at least to minimize this drawback.

SUMMARY OF THE INVENTION

To achieve this and other objects, the invention proposes that the conoid or pyramidoid mirror be made to conform to the following dimensional relationships which apply to each cross-section of said mirror through a plane of symmetry:

$$\frac{D}{d} \simeq \frac{\sin (\theta - \gamma)}{\sin (\theta' - \gamma)},$$

where $D$ and $d$ arae respectively the cross-sectional lengths of said major and minor bases of said mirror in the cross-sectional plane in question, $\gamma$ is half the mean apex angle of said mirror in the cross-sectional plane in question, and $\theta$ is half the maximum pre-determined angle of the angular extension of the radiant beams received at said minor base of said mirror.

DESCRIPTION OF THE DRAWINGS

In order that the invention shall be more clearly understood, reference will now be made to the accompanying drawings which show certain embodiments thereof schematically and by way of example, and in which.

SPECIFIC DESCRIPTION OF PREFERRED EMBODIMENTS

Figure 1:
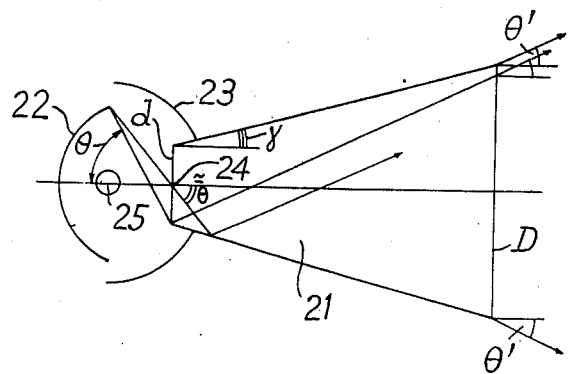
FIG. 1 shows an optical projector device having two spherical collecting mirrors which deliver to a conical or pyramidal mirror, flux at a maximum angle of collection less than 180°.

Referring now to the drawings, as shown very schematically in FIG. 1 for one cross-sectional plane of symmetry a first embodiment of an optical projector according to the invention comprises a conical or pyramidal mirror 21 the minor base of which, whose cross-sectional length is $d$, in conjunction with two spherical mirrors 22 and 23 (the centers (foci) of which are situated respectively half way between the center 24 of the minor base and the center 25 of the source) entirely contains the source optically. Angle $\theta$ is the maximum angle of incidence at which the received flux enters the conical or pyramidal mirror through its minor base. $\gamma$ is half the apex angle of the mirror in the cross-sectional plane in question. D is the cross-sectional length of the major base in the said cross-sectional plane.

If for example $\theta = 50°$ and $\gamma = 15°$ and half $\theta'$ the total angle required for the emerging beam is 25°, applying the dimensional relationship according to the present invention gives $D/d = 3.30$. Where $d$ is 60 mm for example, D would be 198 mm. The length of the conical or pyramidal mirror between the two bases will then be 257.5 mm.

Applying the known dimensional relationships referred to above would give $D/d = 5.56$. If $d$ were 60 mm, $D$ would be 334 mm. The length of the mirror would then be 511 mm.

Thus using the proportions according to the present invention it is possible to reduce the size of the conoid or pyramidoid mirror, often to a considerable degree. Taking into account all the beams, whether central or not, and the basic flux which they convey, the average number of reflections p is 0.53 in the example under consideration.

In the case of a device constructed using the known proportional relationships referred to above, p would be 1.39.

In addition, in a projector according to the invention, the homogeneity of the emerging beam is greatly improved compared with prior arrangements.

Figure 2:
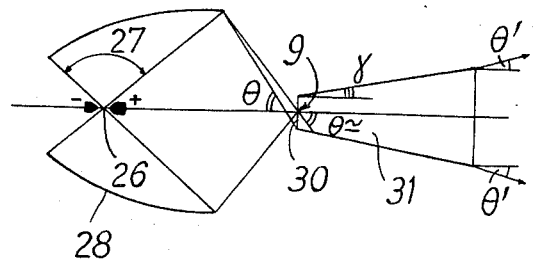
FIG. 2 shows a device having a single elliptical mirror positioned at the rear, for a source which emits radiation over a specific limited angle.

In another embodiment which is shown in one cross-sectional plane of symmetry in FIG. 2, the source 26 is a short-arc arc lamp operating in high pressure xenon. This source emits radiation being received by an elliptical body-of-revolution mirror 28, one of the foci of which coincides with the center 26 of the arc and the other focus of which is situated at the center 9 of the minor base 30 of the frusto-conical or pyramidal mirror 31.

Figure 3:
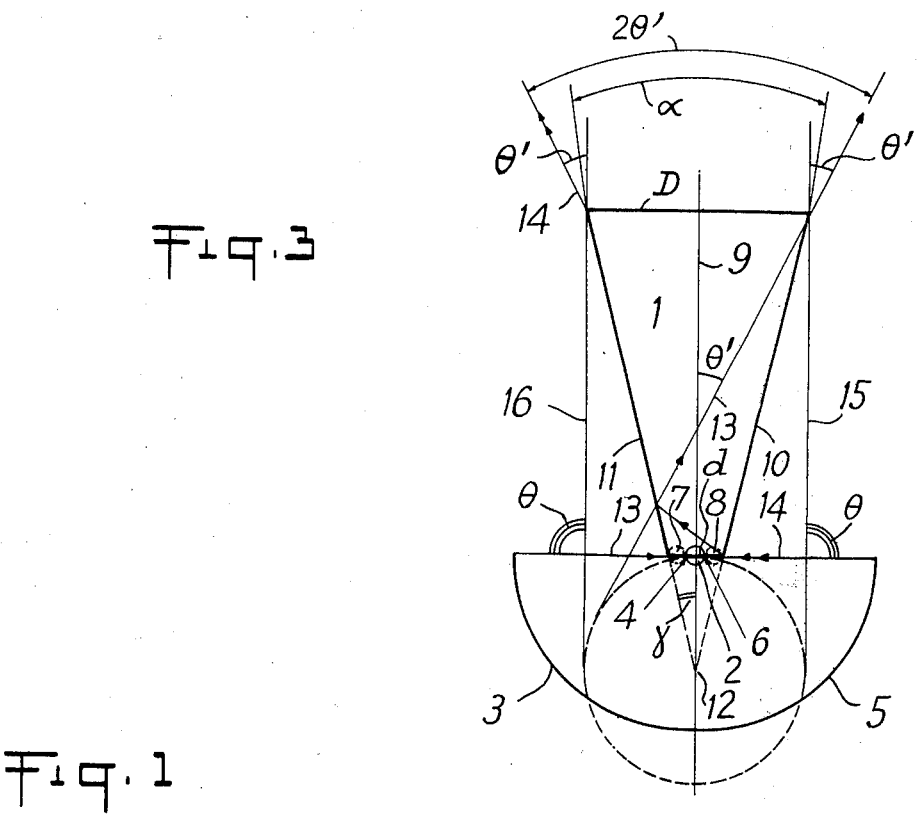
FIG. 3 shows the optical diagram appropriate to a conoid or pyramidoid mirror which has been optimized in accordance with the invention, for the case where $\theta = 90°$.

As shown very schematically in FIG. 3 for one of its cross-sectional planes of symmetry, the optimised conoid or pyramidoid mirror 1 is defined by its bases $D$, $d$, and by the half apex-angle $\gamma$, these values being determined by the dimensional relationships specified above with the object of producing a pre-determined angle of aperture for the emerging beam. It will be recalled that it is not established usage in the lighting field to call the angular field of an illuminating beam in which the radial intensity in a direction which forms an angle of $\alpha/2$ with the main axis of the beam is equal to half the maximum intensity along the axis, the aperture $\alpha$ or "half-intensity angle". The size of the half $\theta'$ the total angular field is substantially linked to that of the aperture $\alpha$ by the relationships according to the invention:

$2\theta' = 19/10\ \alpha$;

or $\theta' = 19/20\ \alpha$

Furthermore, according to the invention, $\alpha = \theta'/2$

In practice, the value of $\theta'$ may be in the neighborhood of $19/20\ \alpha$, lying between approximately $19/10\ \alpha$ and $\alpha$.

In the example described, the radiant source 2 is positioned at the center of the minor base $d$ of the mirror. The reflective optical collecting system is formed by two mirrors. The meridian section 3 of the first is an arc of a circle whose center is 4. The meridian section 5 of the second mirror is an arc of a circle whose center is 6. Centers 4 and 6 do not lie within the luminous body forming the source. In this way, there are obtained from the source two images 7 and 8 which enclose the source itself in the minor base of the mirror. In practice, the position occupied by the source on the optical axis 9 of the projector may advantageously be slightly displaced towards the interior of the conoid or pyramidoid mirror, being, for example, such that perpendiculars to the lateral reflective faces (such as 10 and 11), when extended through the center of the luminous body forming the source, passes substantially through the edge of the minor base of the mirror.

If it is desired to construct the path of the beams in the mirror, it is known to be necessary to consider a circle tangent to the minor base of the mirror whose center 12 is situated on the optical axis 9 at the inter-section of extensions of the lateral faces 10 and 11 of the mirror. Any beam emerging from a point on the major base $D$ follows a straight line tangent to this circle. It can thus be seen that the maximum field angle, which is that formed by beams such as 13 and 14 which have the greatest inclination relative to the optical axis is $2\ \theta'$, while the beams which have the least inclination, which are such as 15 and 16 in this instance, emerge parallel to the axis. This arrangement, in which the diameter of the circle constructed is $D$, and which results from the fact that $$\gamma = \frac{9}{20}\alpha = \frac{\theta'}{2}$$

when the dimensional proportions according to the invention are observed, explains the remarkable photometric balance obtained in a projector according to the invention. The emerging beams effectively cover the whole of the illuminated field from the axis to the edges without re-intersecting on the axis. The compromise is thus achieved between the conflicting aims of obtaining the greatest possible overall homogeneity in the beam and the highest level of intensity along the axis. Any other compromise would detract from homogeneity to the sole benefit of intensity along the axis, or else would reduce intensity along the axis to produce a pointless increase in homogeneity.

Another advantage of a projector according to the invention is that it gives the most compact dimensions for a conoid or pyramidoid mirror which will produce a given aperture $\alpha$. If $\gamma < \theta'/2$, the length of the mirror is such that it increases rapidly while ratio $D/d$ is also greater.

The pre-determined size of the angular aperture may of course be different in different planes of symmetry. As an example, one value may be decided on in a vertical plane of symmetry and a larger value in a horizontal plane of symmetry. This is helpful in particular in devices intended for lighting purposes where the aim is often to produce a beam which is narrower vertically than horizontally, and where the light sources available often contain an elongated luminous body. The mirror according to the invention then takes the form of a pyramidoid in which the apex formed by the vertical lateral faces is not the same as that formed by the two other faces. The reflective optical collector system is then a cylindrical mirror, the vertical cross-section of which takes the form shown in FIG. 3, and which has added to it at the ends two vertical plane mirrors for example.

It is also possible to arrange the dimensions of the conoid or pyramidoid mirror in the way called for by the invention in one plane, which may be vertical for example, and to arrange its dimensions in any other known way in another plane, which may be horizontal for example. In this case, the optical projector device will benefit from the advantages inherent in the present invention in the vertical plane. To give a numerical example (which does not refer to FIG. 3), in the vertical cross-sectional plane of symmetry of the pyramidoid mirror, its minor base may be 60 mm long, its major base 185 mm long, half the angle at the apex may be 180° and the length between the two bases may therefore be 192 mm, this giving an angular field of beam in this plane of 38°. In the horizontal cross-sectional plane of symmetry, the pyramidoid mirror may observe other dimensional relationships to suit the desired result and any restrictions placed on size.

I claim:

1. An optical projector for supplying a beam of radiation, the total angular field $2\theta'$ of which is determined in at least one reference plane, the angular field containing all the radiant flux, comprising:

a. a source of radiation;

b. an optical collector system for receiving and reflecting radiation from said source; and c. a conoid mirror having a minor base and a major base in which said minor base in conjunction with said optical collector system entirely contain optically said source of radiation, said mirror having at least said reference plane as a plane of symmetry, and wherein said mirror has dimensional relationships which apply to a cross-section through at least one plane of symmetry in conformity with the equation $$\frac{D}{d} \cong \frac{\sin(\theta - \gamma)}{\sin(\theta' - \gamma)}$$

where $D$ and $d$ are, respectively, the cross-sectional lengths of said major and minor bases of said mirror in said cross-sectional plane, $\gamma$ is half the mean apex angle of said mirror in said cross-sectional plane, and $\theta$ is half a maximum predetermined angle of the angular extension of radiant beams received at said minor base of said mirror.

2. A projector according to claim 1 wherein said mirror produces a half intensity angle $\alpha$ which is predetermined in at least one reference plane, said angle $\alpha$ being that for which the radial intensity at edges of the field of radiation is equal to half the maximum value of the field, and wherein $\theta'$ is substantially determined by the relationship $\theta' = 19/20\ \alpha$.

3. A projector according to claim 1, wherein $\theta'$ and $\gamma$ are, in addition, substantially linked by the following relationship
$\gamma = \theta'/2$ 4. A projector according to claim 3 wherein said mirror produces a half intensity angle $\gamma$ which is predetermined in at least one reference plane, said angle $\gamma$ being that for which the radial intensity at edges of the field of radiation is equal to half the maximum value of the field, and wherein $\theta'$ is substantially determined by the relationship $\theta' = 19/20\ \alpha$ 5. A projector according to claim 1 wherein said conoid mirror is a pyramidoid mirror.

6. A projector according to claim 2 wherein said conoid mirror is a pyramidoid mirror.

7. A projector according to claim 4 wherein said conoid mirror is a pyramidoid mirror.

* * * * *